United States Patent [19]

Gates

[11] 4,136,658

[45] Jan. 30, 1979

[54] SPEED SENSITIVE PRESSURE REGULATOR SYSTEM

[75] Inventor: Marvin A. Gates, Chillicothe, Ill.

[73] Assignee: Caterpillar Tractor Co., Peoria, Ill.

[21] Appl. No.: 760,062

[22] Filed: Jan. 17, 1977

[51] Int. Cl.² .............................................. F02D 1/04
[52] U.S. Cl. ............................................. 123/140 MC
[58] Field of Search ..... 123/140 MC, 119 C, 119 EC; 263/36 A, DIG. 51

[56] References Cited

U.S. PATENT DOCUMENTS

| | | | |
|---|---|---|---|
| 3,695,245 | 10/1972 | Ishida | 123/140 MC |
| 3,916,862 | 11/1975 | Clouse et al. | 123/140 MC |

*Primary Examiner*—Samuel Feinberg
*Attorney, Agent, or Firm*—John W. Grant

[57] ABSTRACT

A speed sensitive pressure regulator system includes a diaphragm of resilient flexible material positioned within a housing and forming an actuating chamber therein. A valve is associated with a passage and is movable between a first position at which fluid pressure in the actuating chamber is substantially equal to the fluid pressure in the passage and a second position at which the fluid pressure in the actuating chamber is less than the fluid pressure in the passage. The valve is connected to the diaphragm in a manner sufficient for biasing the valve toward the second position in response to pressurized fluid in contact with the diaphragm. A flyweight assembly is associated with the valve and is of a construction sufficient for moving the valve to its first position in response to rotation of the flyweight assembly above a preselected speed and for permitting the valve to move to the second position in response to a decrease in the rotational speed of the flyweight assembly below the preselected speed.

5 Claims, 3 Drawing Figures

SPEED SENSITIVE PRESSURE REGULATOR SYSTEM

BACKGROUND OF THE INVENTION

The fuel adjusting member of a compression ignition engine is normally controlled by a speed sensitive governor which adjusts the position of the fuel adjusting member in response to changing load conditions which cause a change in the engine speed. An air fuel ration control is also used on some engines in combination with a governor to coordinate the movement of the fuel adjusting member and thus the amount of fuel with the amount of air available in the inlet manifold to keep the exhaust smoke to a minimum. Although this combination of components has successfully reduced the emission of exhaust smoke under most conditions, it has been found that controlling the torque rise by decreasing the amount of fuel delivered to the combustion chambers when the engine speed decreases from its rated speed to its peak torque speed under the influence of a load will reduce the amount of exhaust smoke during that period of operation. However, one of the problems has been that heretofore it has been necessary to redesign the governor for achieving this feature rather than providing an add-on component to utilize the capability of an existing component. For example, it has been found that reducing the air pressure at pressure at the air fuel ratio control under certain conditions causes it to move the fuel adjusting member toward a reduced fuel setting. However, a speed sensitive pressure regulator has not been available heretofore for reducing the air pressure to changes in engine speed.

SUMMARY OF THE INVENTION

The present invention is directed to overcoming one or more of the problems as set forth above.

According to the present invention there is provided a speed sensitive pressure regulator system which includes a housing, a diaphragm being of resilient flexible material and positioned within the housing and forming an actuating chamber, and passage means for introducing pressurized fluid into the chamber at a preselected pressure. A valve is associated with the passage means and is movable between a first position at which the fluid pressure in the actuating chamber is substantially equal to the fluid pressure in the passage means and a second position at which the fluid pressure in the actuating chamber is less than the fluid pressure in the passage means. The valve is connected to the diaphragm in a manner sufficient for biasing the valve toward the second position in response to pressurized fluid in contact with the diaphragm. A flyweight assembly is associated with the valve and is of a construction sufficient for moving the valve to its first position in response to rotation of the flyweight assembly above a preselected speed and for permitting the valve to move to the second position in response to a decrease in the rotational speed of the flyweight assembly below the preselected speed.

DETAILED DESCRIPTION OF THE INVENTION

Figure 1:
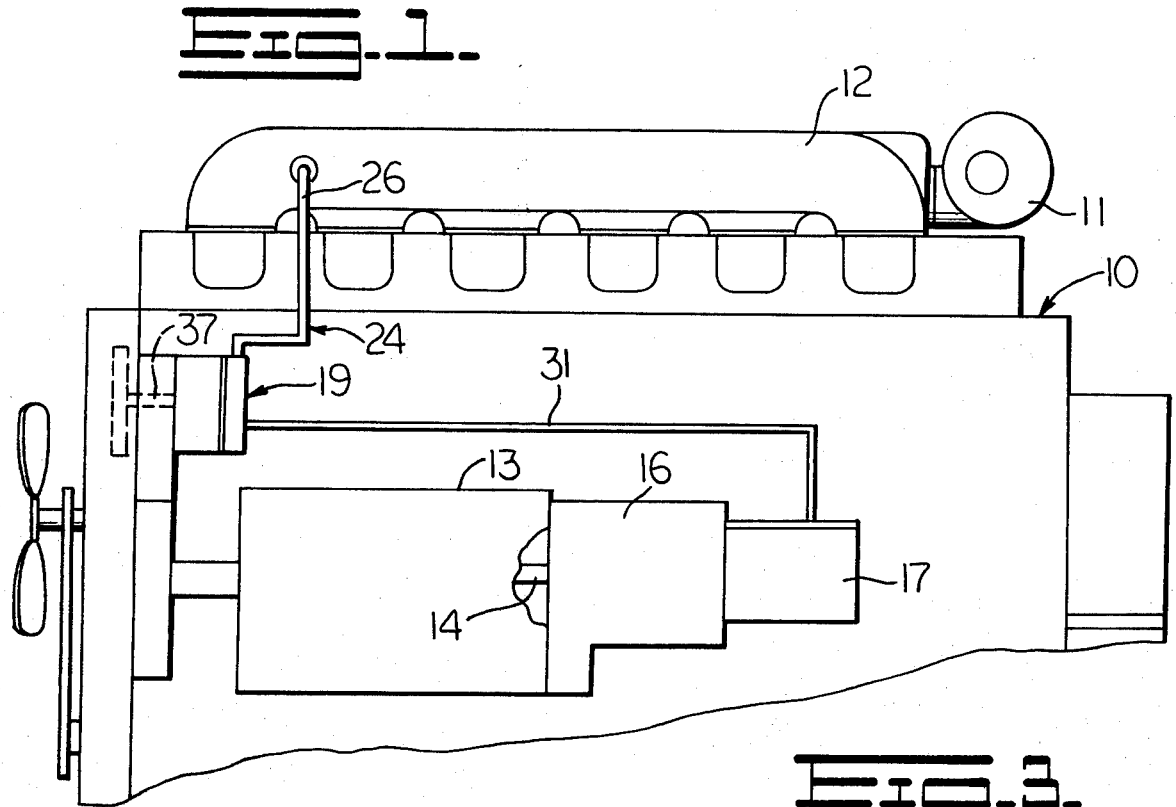
FIG. 1 is a side elevational view of an engine having a speed sensitive pressure regulator system mounted thereon.
Figure 2:
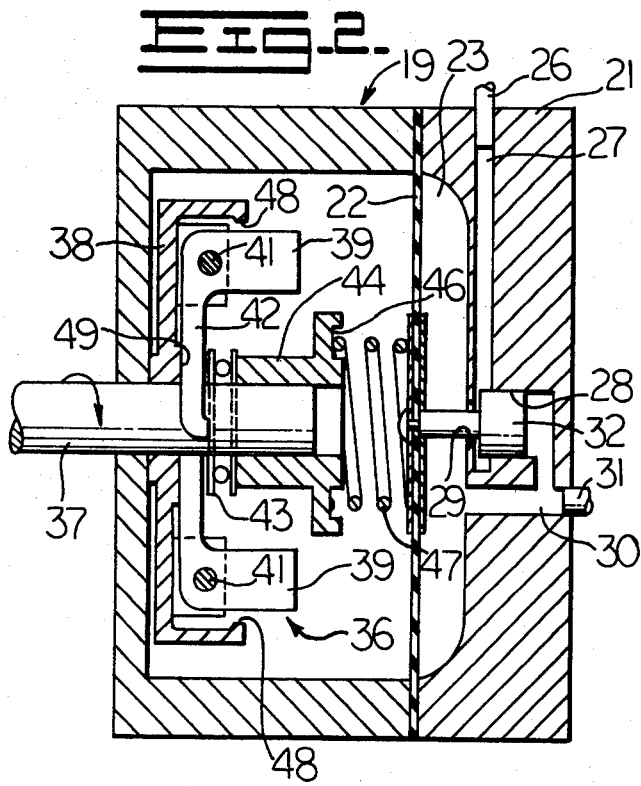
FIG. 2 is a cross-sectional view of the speed sensitive pressure regulator.

Referring now to FIGS. 1 and 2, an internal combustion engine is generally indicated by the reference numeral 10. A supercharger or turbocharger 11 is connected to an inlet manifold 12 and is operative to supply air under pressure to the inlet manifold. A fuel pump 13 is mounted on the engine and has a fuel adjusting member 14 movable rectilinearly by a speed responsive governor 16 to increase or decrease delivery of the fuel to the combustion chambers in response to changes in the engine speed due to variations in the load imposed on the engine. Air fuel ratio control 17 is fastened to one end of the governor and is connected to the inlet manifold through a speed sensitive pressure regulator 19.

The air fuel ratio control 17 is of conventional construction and is operative in the usual manner in response to changes in the air pressure in the inlet manifold 12 to coordinate the movement of the fuel adjusting member 14 with the amount of air available in the inlet manifold particularly during acceleration. For an understanding of the present invention it is sufficient to note that the air fuel ratio control is connected to the fuel adjusting member and is so constructed to have the capability of moving the fuel adjusting member in a direction to reduce fuel delivery to the engine under certain conditions. One such condition is the decreasing of the air pressure communicated to the air fuel ratio control after the fuel adjusting member has been moved to its maximum fuel position by the governor.

Referring now to FIG. 2, a speed sensitive pressure regulator 19 includes a housing 21 having a diaphragm 22 of resilient flexible material positioned therein. The peripheral edge of the diaphragm is sealingly clamped between the mating elements forming the housing and forms an actuating chamber 23 in the housing.

A passage means 24 connects the inlet manifold 12 to the actuating chamber 23 and includes a first conduit 26, a first port 27, a bore 28 and a valve opening 29. A second port 30 and a second conduit 31 connect the actuating chamber with the air fuel ratio control.

A valve 32 is slidably positioned within the bore 28 and is movable between first and second positions. In the first position the air pressure in the actuating chamber 23 and thus the air fuel ratio control 17 is substantially equal to the air pressure in the passage means 24 and thus the inlet manifold 12. In the second position of the valve, communication through the openings 29 is reduced and the air pressure in the actuating chamber and air fuel ration control is less than the air pressure in the passage means and inlet manifold. The valve is connected to the diaphragm 22 in a manner so that the valve is biased toward the second position in response to pressurized air in contact with the diaphragm in the actuating chamber.

A flyweight assembly 36 is associated with the valve 32 and has a shaft 37 driven by a gear train of the engine at a speed proportional to the speed of the engine. Alternately the shaft may be driven by other suitable means such as a belt and a pulley arrangement, sprocket and chain arrangement, and the like. A flyweight carrier 38 is secured to the shaft within the housing and pivotally carries a pair of diametrically opposed flyweights 39 at pivots 41. Each flyweight has an inwardly extending arm 42, the distal end of which engages a thrust bearing 43. A riser 44 is piloted on the inner end of the shaft and has one end in abutment with the thrust bearing. A spring seat 46 is formed on the riser and receives one end of a coil spring 47 which is physically positioned between the riser and the diaphragm 22 with its other end in abutment with the diaphragm. A maximum travel stop 48 is provided on the flyweight carrier to limit the pivotal movement of each flyweight when the engine is running. A protrusion 49 is formed on the carrier for engagement by the arms and serves as a maximum travel stop for the flyweights.

OPERATION

Prior to starting the engine and up to the preselected minimum speed, the flyweight assembly 36 is in the position shown with the valve 32 being in the first position. Thus the speed sensitive pressure regulator 19 allows normal air fuel ratio control function both in starting and at the low idle speeds.

As the engine speed increases in response to movement of the fuel adjusting member to an increased fuel position by the operator, the air pressure in the inlet manifold 12 and thus the chamber 23 also increases. The air pressure in the chamber causes the diaphragm 22 to exert a biasing force against the valve 32 urging it toward the second position. However, the engine speed increase also causes the flyweights to pivot about their pivots 41 due to centrifugal action so that the arms 42 exert a biasing force against the diaphragm through the riser 44 and spring 47 in opposition to the biasing force generated by the increase in air pressure in the chamber. With the engine lightly loaded, the biasing force generated by the flyweights is greater than the biasing force generated by the air pressure in the chamber so that the valve is urged to its first position. At approximately 2,100 rpm the flyweights contact the maximum travel stops 48 limiting further movement of the flyweights. The speed of the engine can continue to increase to the high idle speed indicated at point A on the graph of FIG. 3.

When the engine is running at the high idle speed and a load is placed on the engine sufficient to cause a decrease in engine speed initially the valve 32 will remain in the first position and has no effect on the air fuel ratio control operation. Thus the governor 16, in attempting to maintain the engine speed, moves the fuel adjusting member 14 to an increased fuel position for increasing fuel to the combustion chambers. When the engine speed decreases to the rated speed, movement of the fuel adjusting member is stopped by the air fuel ratio control 17. The torque of the engine at rated speed is indicated by the point B in FIG. 3. As the engine speed drops below the rated speed, the flyweights 39 commence to move away from the maximum travel stop 48 resulting in a decrease in the biasing force acting on the valve. When this happens the biasing force exerted by the diaphragm 22 in response to the air pressure in the actuating chamber 23 urges the valve 32 toward the second position to progressively decrease communication through the passage means 24 from the inlet manifold 12 to the air fuel ratio control 17. The air pressure in the actuating chamber is reduced accordingly so that the biasing force exerted by the diaphragm substantially balances the biasing force of the flyweights and spring 47. Since the air fuel ratio control is connected to the actuating chamber the air pressure therein is also reduced. As previously stated, a reduction in the air pressure in the air fuel ratio control causes the air fuel ratio control to move the fuel adjusting member toward a decreased fuel position. By decreasing the fuel to the combustion chambers as the engine speed decreases under the influence of the load, the torque rise curve will be modified and will follow the solid line curve 51 from point B to point C which represents the peak torque of the engine.

As a comparison, without the speed sensitive pressure regulator 19 of the present invention, the torque would continue to increase along the broken line 52 between points B and D when the engine speed is reduced below the rated speed due to the loading on the engine.

Figure 3:
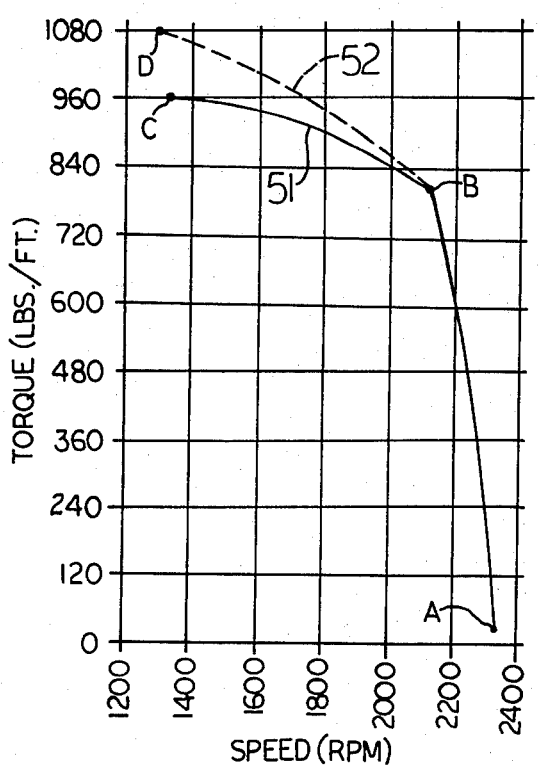
FIG. 3 is a graphic illustration of the torque curves of an engine with and without the speed sensitive pressure regulator system.

It is to be understood that the modified torque rise curve shown in FIG. 3 is only one of the numerous torque rise curves which can be obtained by use of the present torque rise limiter. For example, the modified torque rise curve may be shifted upwardly or downwardly from that shown by changing one or more of the following:

(a) replacing the coil spring 47 with one having a different spring rate;

(b) changing the effective weight of the flyweights 39; or (c) changing the maximum travel stops 48.

Other aspects, objects and advantages will become apparent from a study of the drawings, the disclosure and the appended claims.

THE EMBODIMENTS OF THE INVENTION IN WHICH AN EXCLUSIVE PROPERTY OR PRIVILEGE IS CLAIMED ARE DEFINED AS FOLLOWS:

1. A speed sensitive pressure regulator system comprising:

a housing;

a diaphragm being of resilient flexible material and positioned within the housing and forming an actuating chamber;

passage means for introducing pressurized fluid into the chamber at a preselected pressure;

a valve associated with the passage means and being movable between a first position at which the fluid pressure in the actuating chamber is substantially equal to the fluid pressure in the passage means, and a second position at which the fluid pressure in the actuating chamber is less than the fluid pressure in the passage means, said valve being connected to the diaphragm in a manner sufficient for biasing the valve toward the second position in response to pressurized fluid in contact with the diaphragm; and a flyweight assembly associated with the valve and being of a construction sufficient for moving the valve to its first position in response to rotation of the flyweight assembly above a preselected speed and for permitting the valve to move to the second position in response to a decrease in the rotational speed of the flyweight assembly below the preselected speed.

2. The speed sensitive pressure regulator system of claim 1 including a spring physically disposed between the flyweight assembly and the diaphragm.

3. The speed sensitive pressure regulator system of claim 2 wherein said flyweight assembly includes a flyweight carrier, a pair of flyweights pivotally connected to the flyweight carrier, a thrust bearing positioned between the flyweight and the spring, and a maximum travel stop to stop pivotal movement of the flyweights when the rotational speed of the flyweight assembly exceeds said preselected speed.

4. The speed sensitive pressure regulator system of claim 3 in combination with an internal combustion engine having a governorcontrolled fuel adjusting member, a supercharger to supply air through an inlet manifold and to the engine, an air fuel ratio control operative to coordinate the movement of the fuel adjusting member with the amount of air pressure available in the inlet manifold, and including a port formed in the housing in communication with the actuating chamber, a conduit connecting the port with the air fuel ratio control, and another conduit connecting the inlet manifold with said passage means.

5. The speed sensitive pressure regulator system of claim 4 wherein said flyweight assembly is driven by the engine at a rotational speed proportional to the engine speed.

* * * * *